United States Patent
Zhang et al.

(10) Patent No.: US 12,312,538 B2
(45) Date of Patent: May 27, 2025

(54) EFFICIENT HEAT-INDUCTION DECOKING DEVICE AND METHOD FOR THERMAL CONVERSION OF SOLID FUELS

(71) Applicant: SOUTHEAST UNIVERSITY, Nanjing (CN)

(72) Inventors: Huiyan Zhang, Nanjing (CN); Siyu Wang, Nanjing (CN); Kai Wu, Nanjing (CN); Jiajun Yu, Nanjing (CN); Yihan Wang, Nanjing (CN); Bingbing Luo, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/954,559

(22) Filed: Nov. 21, 2024

(65) Prior Publication Data

US 2025/0075130 A1    Mar. 6, 2025

Related U.S. Application Data

(63) Continuation of application No. PCT/CN2022/133360, filed on Nov. 22, 2022.

(30) Foreign Application Priority Data

May 26, 2022    (CN) .......................... 202210584624.7

(51) Int. Cl.
 *C10B 33/00*    (2006.01)
 *C10G 1/00*    (2006.01)
(52) U.S. Cl.
 CPC ............ *C10B 33/006* (2013.01); *C10G 1/002* (2013.01); *C10G 2300/1011* (2013.01)

(58) Field of Classification Search
 CPC ....... C10B 33/006; C10B 53/02; C10G 9/005; C10G 1/002; C10G 1/02; C10G 2300/1011–1018
 See application file for complete search history.

(56) References Cited

FOREIGN PATENT DOCUMENTS

| CN | 102010729 A | 4/2011 | |
| CN | 102105568 A | * 6/2011 | .............. C10J 3/463 |

(Continued)

OTHER PUBLICATIONS

English machine translation of CN 102105568. (Year: 2011).*

(Continued)

*Primary Examiner* — Renee Robinson
(74) *Attorney, Agent, or Firm* — Bayramoglu Law Offices LLC

(57) ABSTRACT

The provided is a novel heat-induction decoking device and method tailored for the thermal conversion of solid fuels. The efficient heat-induction decoking device for the thermal conversion of the solid fuels includes: a decoking tank body, which is configured to condense a macromolecular tar in a pyrolysis gas and discharge the condensed tar from a bottom to a tar tank for storage; an electromagnetic induction heating system, which is disposed on an outer wall surface of the decoking tank body to heat the outer wall surface of the decoking tank body; an ultrasonic vibration decoking system, which is disposed on the decoking tank body to enable the decoking tank body to generate vibration by ultrasonic wave so as to enhance tar fluidity. This innovative design not only reduces energy consumption and equipment wear but also extends system operational lifespan, thereby offering substantial improvements in economic and environmental sustainability.

20 Claims, 2 Drawing Sheets

(56) References Cited

FOREIGN PATENT DOCUMENTS

| | | | | |
|---|---|---|---|---|
| CN | 105749838 | A | 7/2016 | |
| CN | 210683695 | U * | 6/2020 | .............. C10G 9/16 |
| CN | 114989841 | A | 9/2022 | |
| FR | 2750138 | A1 | 12/1997 | |

OTHER PUBLICATIONS

English machine translation of CN 210683695. (Year: 2020).*
Li Jin, et al., Purification of rapid pyrolysis tar from fluidized bed woody biomass, Biotechnology and Healthcare, 2011, pp. 69-70.

* cited by examiner

EFFICIENT HEAT-INDUCTION DECOKING DEVICE AND METHOD FOR THERMAL CONVERSION OF SOLID FUELS

CROSS-REFERENCE TO THE RELATED APPLICATIONS

This application is a continuation application of International Application No. PCT/CN2022/133360, filed on Nov. 22, 2022, which is based upon and claims priority to Chinese Patent Application No. 202210584624.7, filed on May 26, 2022, the entire contents of which are incorporated herein by reference.

TECHNICAL FIELD

The present disclosure relates to the field of biomass pyrolysis decoking technologies and in particular to an efficient heat-induction decoking device and method for thermal conversion of solid fuels.

BACKGROUND

At the epochal background of "carbon peaking and carbon neutrality", the biomass pyrolysis polygeneration process has become a key development theme of the bio-thermal conversion technologies, namely, the high-value oils, gases, carbons and chemicals are produced by pyrolysis polygeneration. However, the tar generated in biomass pyrolysis process may be gradually condensed and polymerized into a viscous liquid. Due to its long-time clinging to a wall surface of a container, the tar may be easily condensed into coke lumps. When the coke lumps cling to the inner walls of pipes, the pipes may be clogged, bringing damage to the equipment and increasing the risk of the system operation.

Therefore, in the field of the biomass pyrolysis production, equipment decoking is one of the quite important stages. The current decoking processes mainly include a mechanical method and a thermal chemical method. In the mechanical method, a mechanical internal member is disposed in the equipment to forcedly break the coke lumps on the wall surface with an external mechanical force and wash and discharge them with high-pressure water flow, which may bring destructive wear to the equipment and shorten the service life of the system. For carrying the mechanical decoking process, a large-scale washing equipment and a decoking device are usually required, consuming a huge amount of energy and making the washing process complex. In this case, the continuous operation of the system and economic benefits are seriously affected. Furthermore, the tar also contains poisonous and harmful substances such as phenol, aldehyde, methanol and high-content polycyclic aromatic hydrocarbon, which not only harm the human health but also severely pollute the environment if directly discharged. The thermal chemical method refers to that under a given reaction condition (such as temperature, and catalyst and the like), tar undergoes thermal chemical conversion and thus is decomposed into smaller gaseous molecules. But this method increases additional heat source consumption while changing the chemical composition of the light biological oil and the non-condensable gas, which is unfavorable for polygeneration benefits of the system. To sum up, it is extremely critical to develop a device capable of performing efficient decoking without a mechanical internal member.

SUMMARY

In order to address the shortcomings in the prior arts, the present disclosure provides an efficient heat-induction decoking device and method for thermal conversion of solid fuels so as to address the challenges associated with high energy consumption, complex system configuration, and excessive pipe wear in the mechanical decoking equipment, greatly reducing the initial investment of the system and prolonging the service life and thus effectively improving the economic benefits of the system.

In order to achieve the above purposes, the present disclosure provides an efficient heat-induction decoking device for the thermal conversion of the solid fuels, which includes: a decoking tank body, an electromagnetic induction heating system and an ultrasonic vibration decoking system, wherein
the decoking tank body is configured to condense a macromolecular tar in a pyrolysis gas and discharge the condensed tar from a bottom into a tar tank for storage;
the electromagnetic induction heating system is disposed on an outer wall surface of the decoking tank body to heat the outer wall surface of the decoking tank body;
the ultrasonic vibration decoking system is disposed on the decoking tank body to vibrate the decoking tank body through ultrasonic wave so as to speed up tar flow.

Furthermore, the electromagnetic induction heating system further comprises a temperature measuring device, an electromagnetic induction host, an induction coil and a coil bracket, wherein,
the temperature measuring device is configured to measure a temperature of the outer wall surface of the decoking tank body and transmit the measured temperature to the electromagnetic induction host;
the electromagnetic induction host is connected by a wire with the induction coil to control a working time and a working power of the induction coil;
the induction coil is uniformly fixed on an outer side of the decoking tank body by the coil bracket to enable a high-frequency alternating current in the induction coil to act on a metal wall surface by a heat insulation material of the decoking tank body and hence heat the metal wall surface by electromagnetic heating.

Furthermore, the ultrasonic vibration decoking system comprises ultrasonic units and an ultrasonic controller, wherein,
the ultrasonic units are uniformly fixed on a top and a bottom of the decoking tank body, and connected with the ultrasonic controller;
the ultrasonic controller is configured to control a working time and an ultrasonic power of the ultrasonic units.

Furthermore, each of the ultrasonic units further comprises a transducer, a waveguide and a wire, wherein,
the transducer is connected with the ultrasonic controller through a wire, and the waveguide is fixedly welded on the wall surface of the decoking tank body to speed up tar flow with a mechanical effect of the ultrasonic wave on the wall surface.

In order to achieve the above purposes, the present disclosure further provides a coupling decoking system for thermal conversion of solid fuels, which includes: the efficient heat-induction decoking device for the thermal conversion of the solid fuels, which is respectively connected with a biomass pyrolysis reactor and a second-stage condenser through a pipe; wherein,
the biomass pyrolysis reactor is configured to pyrolyse a biomass raw material and discharge the pyrolysed biomass carbon from a bottom of the reactor, and a pyrolysis gas is conveyed from top into the efficient heat-induction decoking device for the thermal conversion of the solid fuels;

the efficient heat-induction decoking device for the thermal conversion of the solid fuels performs decoking on the pyrolysis gas from the biomass pyrolysis reactor and conveys the decoked gas to the second-stage condenser;

a raw material conveyer conveys a biomass raw material from a material feeding bin to the biomass pyrolysis reactor;

a screw conveyer is located at the bottom of the biomass pyrolysis reactor to convey a biomass carbon from the bottom of the biomass pyrolysis reactor to outside the system.

Furthermore, the biomass pyrolysis reactor comprises a reactor body, a stirring paddle, a main shaft and a drive motor; wherein, the stirring paddle is fixed on the main shaft and rotated by the drive motor, and the drive motor is located on the top of the reactor body, and the stirring paddle is located inside the reactor body;

the stirring paddle is configured to stir a biomass raw material in the biomass pyrolysis reactor to enable the biomass raw material be heated uniformly.

Furthermore, the second-stage condenser comprises a condensation tank, a spray device and an oil storage tank, wherein, the spray device is located above the condensation tank and the oil storage tank is located below the condensation tank;

the spray device is configured to condense the pyrolysis gas in the condensation tank;

the condensation tank is configured to discharge a condensed light oil from a bottom of the condensation tank to the oil storage tank.

Furthermore, further comprising a gas box, wherein the gas box is connected with the second-stage condenser to receive a non-condensable gas and perform purification treatment.

In order to achieve the above purposes, the present disclosure further provides an efficient heat-induction decoking method for the thermal conversion of the solid fuels, using the efficient heat-induction decoking device for the thermal conversion of the solid fuels, wherein the method comprises:

based on a temperature of an outer wall surface of the decoking tank body, controlling a temperature and a heating time of the outer wall surface of the decoking tank body;

by ultrasonic wave, enabling the wall surface of the decoking tank body to generate ultrasonic vibration so as to speed up tar flow.

Compared with the prior arts, the efficient heat-induction decoking device and method for the thermal conversion of the solid fuels in the present disclosure have the following beneficial effects:

1) By electromagnetic heating, the metal wall surface is heated to soften the tar to be easy to flow and prevent condensation due to long-time clinging on wall surface and deposition into coke lumps. The coupling effect of the heat-induction vortex and the high-frequency sound field can effectively promote the tar fluidity and improve the decoking efficiency.

2) The induction heating system and the ultrasonic system of the present disclosure can be adjusted in operation time and power in time based on coking situations. Before the tar is formed into coke lumps, the tar is physically removed by fully discharging and collecting the tar from the bottom of the decoking tank, effectively improving the continuous operation time of the pyrolysis system.

3) The decoking device in the present disclosure is arranged outside the equipment, which addresses the challenges associated with high energy consumption, complex system configuration, and excessive pipe wear in the mechanical decoking equipment, greatly reducing the initial investment of the system and prolonging the service life and thus effectively improving the economic benefits of the system.

Other features and advantages of the present disclosure will be set out in the following specification and will become apparent partly from the specification or known by practicing the present disclosure.

BRIEF DESCRIPTION OF THE DRAWINGS

The drawings are used to provide further understanding of the present disclosure and constitute a part of the specification and further interpret the present disclosure together with the embodiments of the present disclosure, but not intended to constitute any limitation to the present disclosure.

DETAILED DESCRIPTION OF THE EMBODIMENTS

The preferred embodiments of the present disclosure will be described with the following drawings. It should be understood that the preferred embodiments described hereunder are used only to describe and interpret the present disclosure rather than limit the present disclosure.

Embodiment 1

Figure 1:
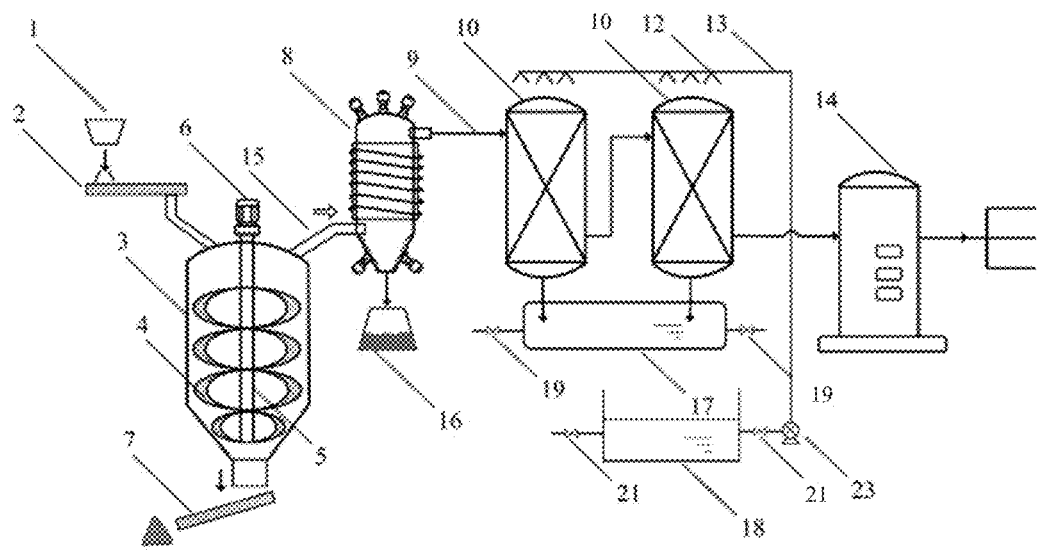
FIG. 1 is a structural schematic diagram illustrating a coupling decoking system for thermal conversion of solid fuels according to an embodiment of the present disclosure.

FIG. 1 is a structural schematic diagram illustrating a coupling decoking system for thermal conversion of solid fuels according to an embodiment of the present disclosure. As shown in FIG. 1, the coupling decoking system for the thermal conversion of the solid fuels in the present disclosure includes a material feeding bin 1, a raw material conveyer 2, a biomass pyrolysis reactor body 3, a stirring paddle 4, a main shaft 5, a drive motor 6, a screw conveyer 7, an efficient heat-induction decoking device for the thermal conversion of the solid fuels 8, a pipe 9, a condensation tank 10, a spray device 12, a condensation pipe 13, a gas box 14, a pyrolysis gas inlet 15, a tar tank 16, an oil storage tank 17, a cooling water box 18, an oil tank valve 19, a water box valve 21, a water pump 23, and a decoking gas outlet 33.

The efficient heat-induction decoking device for the thermal conversion of the solid fuels 8 is respectively connected by a pipe with a biomass pyrolysis reactor 4 and a second-stage condenser 10. At the bottom of the efficient heat-induction decoking device is disposed the pyrolysis gas inlet 15 and at the top is disposed a decoking gas outlet 33. The efficient heat-induction decoking device for the thermal conversion of the solid fuels 8 condenses the macromolecular tar with a higher condensation point in the pyrolysis gas and then discharges the condensed tar from the bottom of the decoking tank into the tar tank 16 for storage Preferably, the biomass pyrolysis reactor is composed of the reactor body 3, the stirring paddle 4, the main shaft 5 and the drive motor 6. The stirring paddle 4 is fixed on the main shaft 5 and rotated by the motor 6. The biomass raw material falls into the raw material conveyer 2 through the material feeding bin 1 and enters the pyrolysis reactor through the top of the reactor 3. Under the action of the stirring paddle 4, the material is heated uniformly and the pyrolysed biomass carbon is discharged to the screw conveyer 7 from the bottom of the reactor, and the pyrolysis gas is expelled from the top of the reactor.

Preferably, the second-stage condenser is composed of the condensation tank body 10, the spray device 12 and the oil storage tank 17. The spray device 12 is connected with the water pump 23 by the condensation pipe 13. The water pump 23 conveys cooling water in the cooling water box 18 to the spray device to perform condensation on the pyrolysis gas in the condensation tank. The condensed light oil is discharged from the bottom of the condensation tank to a light oil box. The water in the cooling water box can be discharged by valves at both sides. The light oil in the oil tank may also be discharged by the valves at both sides. The non-condensable gas enters the gas box 14 for purification treatment and then is provided to the users in the network.

Figure 2:
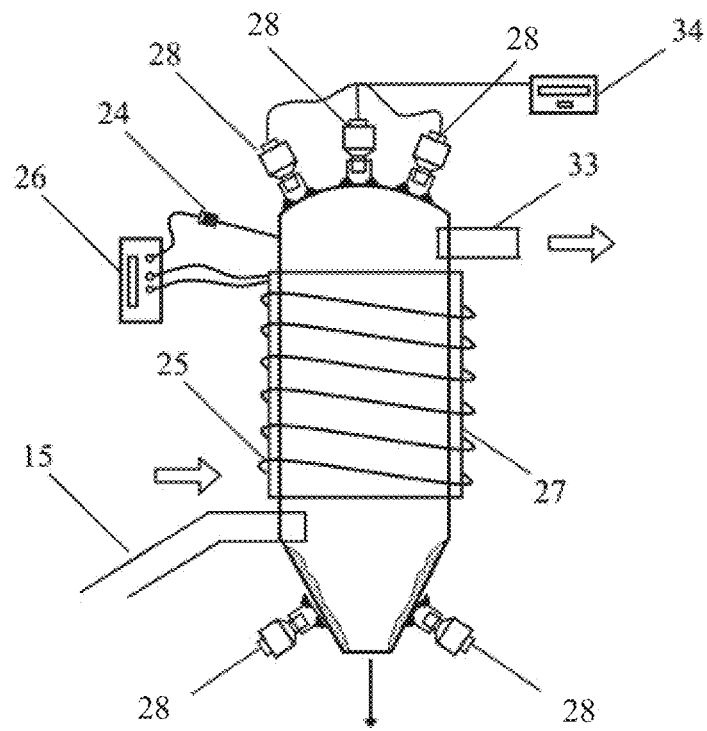
FIG. 2 is a structural schematic diagram illustrating an efficient heat-induction decoking device for the thermal conversion of the solid fuels according to an embodiment of the present disclosure.

FIG. 2 is a structural schematic diagram illustrating an efficient heat-induction decoking device for the thermal conversion of the solid fuels according to an embodiment of the present disclosure. As shown in FIG. 2, the efficient heat-induction decoking device for the thermal conversion of the solid fuels 8 includes a decoking tank body, an electromagnetic induction heating system and an ultrasonic vibration decoking system.

The electromagnetic induction heating system includes a temperature measuring device 24, an electromagnetic induction host 26, an induction coil 25, and a coil bracket 27. The temperature measuring device 24 is used to measure a temperature of an outer wall surface of the decoking tank and transmit the measured temperature to the electromagnetic induction host 26; the electromagnetic induction host 26 is connected with the induction coil 25 through a wire to control the working time and power of the induction coil 25.

In an embodiment of the present disclosure, the induction coil 25 is uniformly fixed on an outer side of the decoking tank by the coil bracket 27. The high-frequency alternating current in the induction coil 25 acts on a metal wall surface by a heat insulation material of the decoking tank so as to perform electromagnetic heating on the metal wall surface.

The ultrasonic vibration decoking system includes plural ultrasonic units 28 and an ultrasonic controller 34. The plural ultrasonic units 28 are uniformly and fixedly welded on the top and bottom of the decoking tank body.

In an embodiment of the present disclosure, as shown in FIG. 2, the plural ultrasonic units 28 are connected with the ultrasonic controller 34 through wires. The ultrasonic controller 34 is used to control a working time and an ultrasonic power of the plural ultrasonic units 28.

Figure 3:
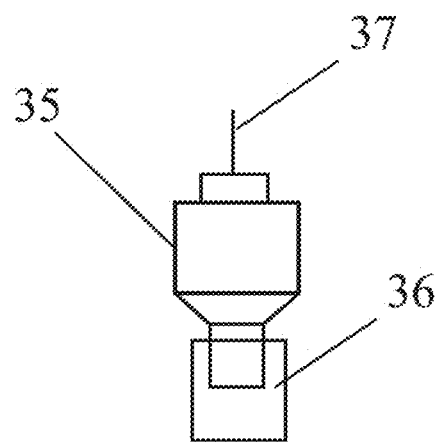
FIG. 3 is a structural diagram illustrating an ultrasonic unit according to an embodiment of the present disclosure.

Preferably, as shown in FIG. 3, each of the ultrasonic units 28 is formed by a transducer 35, a waveguide 36 and a wire 37. The ultrasonic units 28 are connected with the ultrasonic controller 34 through the wires. The waveguide is fixedly welded on a wall surface of the decoking tank to realize the mechanical effect of the ultrasonic wave on the tank wall.

In an embodiment of the present disclosure, the electromagnetic induction heating system is coupled with the ultrasonic vibration decoking system such that they can work independently or together. When the two systems work at the same time, the heat induction vortex and the high-frequency sound field are coupled, which can improve the tar fluidity and removal efficiency.

The efficient heat-induction decoking device for the thermal conversion of the solid fuels in the present disclosure is used to perform electromagnetic induction heating and ultrasonic vibration decoking in the following process.

The pyrolysis gas enters the decoking tank body from bottom; the temperature measuring device is used to measure a temperature of an outer wall surface of the decoking tank and transmit the measured temperature to the electromagnetic induction host; the electromagnetic induction host is connected with the induction coil through a wire to control the working time and power of the induction coil; the high-frequency alternating current in the induction coil heats the metal wall surface by electromagnetic heating, and further controls a wall surface heating power and a wall surface heating time; by heating, the tar condensed on the wall surface is softened to be easy to flow and thus condensation due to long time clinging on the wall surface and deposition into coke lumps can be avoided.

The ultrasonic vibration decoking system is composed of the ultrasonic units and an ultrasonic host. The ultrasonic host controls the working time and the ultrasonic power of each ultrasonic unit. Each of the ultrasonic units includes a transducer and a waveguide. The waveguide is welded on the housing and speeds up the tar flow by the mechanical effect of the ultrasonic wave on the wall surface. Furthermore, the electromagnetic induction heating system and the ultrasonic vibration decoking system are coupled to work independently or together. When the two systems work at the same time, the heat induction vortex and the high-frequency sound field are coupled, which can improve the tar fluidity and removal efficiency.

Those skilled in the arts can understand that the above descriptions are only about the preferred embodiments of the present disclosure and are not intended to limit the present disclosure. Although detailed descriptions are made to the present disclosure by referring to the above embodiments, those skilled in the arts can still make modifications to the technical solutions of the preceding embodiments or make equivalent substitutions for some technical features therein. Any modifications, equivalent substitutions and improvements and etc. made within the spirit and principle of the present disclosure shall be encompassed in the scope of protection of the present disclosure.

What is claimed is:

1. An efficient heat-induction decoking device for thermal conversion of solid fuels, comprising
a decoking tank body, an electromagnetic induction heating system and an ultrasonic vibration decoking system, wherein
the decoking tank body is configured to condense a macromolecular tar in a pyrolysis gas and discharge the macromolecular tar condensed from a bottom into a tar tank for storage;
the electromagnetic induction heating system is disposed on an outer wall surface of the decoking tank body to heat the outer wall surface of the decoking tank body;
the ultrasonic vibration decoking system is disposed on the decoking tank body to vibrate the decoking tank body through ultrasonic wave to speed up tar flow.

2. The efficient heat-induction decoking device according to claim 1, wherein the electromagnetic induction heating system further comprises a temperature measuring device, an electromagnetic induction host, an induction coil and a coil bracket, wherein the temperature measuring device is configured to measure a temperature of the outer wall surface of the decoking tank body and transmit the temperature to the electromagnetic induction host;

the electromagnetic induction host is connected by a wire with the induction coil to control a working time and a working power of the induction coil;

the induction coil is uniformly fixed on an outer side of the decoking tank body by the coil bracket to enable a high-frequency alternating current in the induction coil to act on a metal wall surface by a heat insulation material of the decoking tank body and hence heat the metal wall surface by electromagnetic heating.

3. The efficient heat-induction decoking device according to claim 1, wherein the ultrasonic vibration decoking system comprises ultrasonic units and an ultrasonic controller, wherein the ultrasonic units are uniformly fixed on a top and a bottom of the decoking tank body, and connected with the ultrasonic controller;

the ultrasonic controller is configured to control a working time and an ultrasonic power of the ultrasonic units.

4. The efficient heat-induction decoking device according to claim 3, wherein each of the ultrasonic units further comprises a transducer, a waveguide and a wire, wherein the transducer is connected with the ultrasonic controller through the wire, and the waveguide is fixedly welded on the wall surface of the decoking tank body to speed up tar flow with a mechanical effect of the ultrasonic wave on the wall surface.

5. A coupling decoking system for thermal conversion of solid fuels, comprising:

the efficient heat-induction decoking device for the thermal conversion of the solid fuels according to claim 1, wherein the efficient heat-induction decoking device is respectively connected with a biomass pyrolysis reactor and a second-stage condenser through a pipe; wherein the biomass pyrolysis reactor is configured to pyrolyse a biomass raw material and discharge a pyrolysed biomass carbon from a bottom of the biomass pyrolysis reactor, and the pyrolysis gas is conveyed from a top into the efficient heat-induction decoking device for the thermal conversion of the solid fuels;

the efficient heat-induction decoking device for the thermal conversion of the solid fuels performs decoking on the pyrolysis gas from the biomass pyrolysis reactor to obtain decoked gas and conveys the decoked gas to the second-stage condenser;

a raw material conveyer conveys the biomass raw material from a material feeding bin to the biomass pyrolysis reactor;

a screw conveyer is located at the bottom of the biomass pyrolysis reactor to convey a biomass carbon from the bottom of the biomass pyrolysis reactor to outside the coupling decoking system.

6. The coupling decoking system according to claim 5, wherein the biomass pyrolysis reactor comprises a reactor body, a stirring paddle, a main shaft and a drive motor; wherein the stirring paddle is fixed on the main shaft and rotated by the drive motor, and the drive motor is located on a top of the reactor body, and the stirring paddle is located inside the reactor body;

the stirring paddle is configured to stir the biomass raw material in the biomass pyrolysis reactor to enable the biomass raw material be heated uniformly.

7. The coupling decoking system according to claim 5, wherein the second-stage condenser comprises a condensation tank, a spray device and an oil storage tank, wherein the spray device is located above the condensation tank and the oil storage tank is located below the condensation tank;

the spray device is configured to condense the pyrolysis gas in the condensation tank;

the condensation tank is configured to discharge a condensed light oil from a bottom of the condensation tank to the oil storage tank.

8. The coupling decoking system according to claim 7, wherein the second-stage condenser further comprises a condensation pipe, a water pump, a cooling water box, a water box valve and an oil tank valve; wherein the spray device is connected with the water pump through the condensation pipe, the water pump is connected with the water box valve, the water box valve is disposed at both ends of the cooling water box, the oil tank valve is disposed at both ends of the oil storage tank, and the water pump conveys cooling water in the cooling water box to the spray device.

9. The coupling decoking system according to claim 5, further comprising a gas box, wherein the gas box is connected with the second-stage condenser to receive a non-condensable gas and perform purification treatment.

10. The coupling decoking system according to claim 5, wherein in the efficient heat-induction decoking device, the electromagnetic induction heating system further comprises a temperature measuring device, an electromagnetic induction host, an induction coil and a coil bracket, wherein the temperature measuring device is configured to measure a temperature of the outer wall surface of the decoking tank body and transmit the temperature to the electromagnetic induction host;

the electromagnetic induction host is connected by a wire with the induction coil to control a working time and a working power of the induction coil;

the induction coil is uniformly fixed on an outer side of the decoking tank body by the coil bracket to enable a high-frequency alternating current in the induction coil to act on a metal wall surface by a heat insulation material of the decoking tank body and hence heat the metal wall surface by electromagnetic heating.

11. The coupling decoking system according to claim 10, wherein the biomass pyrolysis reactor comprises a reactor body, a stirring paddle, a main shaft and a drive motor; wherein the stirring paddle is fixed on the main shaft and rotated by the drive motor, and the drive motor is located on a top of the reactor body, and the stirring paddle is located inside the reactor body;

the stirring paddle is configured to stir the biomass raw material in the biomass pyrolysis reactor to enable the biomass raw material be heated uniformly.

12. The coupling decoking system according to claim 10, wherein
the second-stage condenser comprises a condensation tank, a spray device and an oil storage tank, wherein
the spray device is located above the condensation tank and the oil storage tank is located below the condensation tank;
the spray device is configured to condense the pyrolysis gas in the condensation tank;
the condensation tank is configured to discharge a condensed light oil from a bottom of the condensation tank to the oil storage tank.

13. The coupling decoking system according to claim 5, wherein in the efficient heat-induction decoking device, the ultrasonic vibration decoking system comprises ultrasonic units and an ultrasonic controller, wherein
the ultrasonic units are uniformly fixed on a top and a bottom of the decoking tank body, and connected with the ultrasonic controller;
the ultrasonic controller is configured to control a working time and an ultrasonic power of the ultrasonic units.

14. The coupling decoking system according to claim 13, wherein in the efficient heat-induction decoking device, each of the ultrasonic units further comprises a transducer, a waveguide and a wire, wherein
the transducer is connected with the ultrasonic controller through the wire, and the waveguide is fixedly welded on the wall surface of the decoking tank body to speed up tar flow with a mechanical effect of the ultrasonic wave on the wall surface.

15. The coupling decoking system according to claim 14, wherein
the biomass pyrolysis reactor comprises a reactor body, a stirring paddle, a main shaft and a drive motor; wherein
the stirring paddle is fixed on the main shaft and rotated by the drive motor, and the drive motor is located on a top of the reactor body, and the stirring paddle is located inside the reactor body;
the stirring paddle is configured to stir the biomass raw material in the biomass pyrolysis reactor to enable the biomass raw material be heated uniformly.

16. The coupling decoking system according to claim 13, wherein
the biomass pyrolysis reactor comprises a reactor body, a stirring paddle, a main shaft and a drive motor; wherein
the stirring paddle is fixed on the main shaft and rotated by the drive motor, and the drive motor is located on a top of the reactor body, and the stirring paddle is located inside the reactor body;
the stirring paddle is configured to stir the biomass raw material in the biomass pyrolysis reactor to enable the biomass raw material be heated uniformly.

17. An efficient heat-induction decoking method for thermal conversion of solid fuels, using the efficient heat-induction decoking device for the thermal conversion of the solid fuels according to claim 1, wherein
the method comprises:
based on a temperature of the outer wall surface of the decoking tank body, controlling the temperature and a heating time of the outer wall surface of the decoking tank body;
by ultrasonic wave, enabling the wall surface of the decoking tank body to generate ultrasonic vibration to speed up tar flow.

18. The efficient heat-induction decoking method according to claim 17, wherein in the efficient heat-induction decoking device, the electromagnetic induction heating system further comprises a temperature measuring device, an electromagnetic induction host, an induction coil and a coil bracket, wherein
the temperature measuring device is configured to measure the temperature of the outer wall surface of the decoking tank body and transmit the temperature to the electromagnetic induction host;
the electromagnetic induction host is connected by a wire with the induction coil to control a working time and a working power of the induction coil;
the induction coil is uniformly fixed on an outer side of the decoking tank body by the coil bracket to enable a high-frequency alternating current in the induction coil to act on a metal wall surface by a heat insulation material of the decoking tank body and hence heat the metal wall surface by electromagnetic heating.

19. The efficient heat-induction decoking method according to claim 17, wherein in the efficient heat-induction decoking device, the ultrasonic vibration decoking system comprises ultrasonic units and an ultrasonic controller, wherein
the ultrasonic units are uniformly fixed on a top and a bottom of the decoking tank body, and connected with the ultrasonic controller;
the ultrasonic controller is configured to control a working time and an ultrasonic power of the ultrasonic units.

20. The efficient heat-induction decoking method according to claim 19, wherein in the efficient heat-induction decoking device, each of the ultrasonic units further comprises a transducer, a waveguide and a wire, wherein
the transducer is connected with the ultrasonic controller through the wire, and the waveguide is fixedly welded on the wall surface of the decoking tank body to speed up tar flow with a mechanical effect of the ultrasonic wave on the wall surface.

\* \* \* \* \*